United States Patent [19]

Takeuchi

[11] Patent Number: 5,326,146
[45] Date of Patent: Jul. 5, 1994

[54] APPARATUS FOR CONTROLLING A PLURALITY OF VEHICLE SAFETY DEVICES

[75] Inventor: Kunihiro Takeuchi, Higashimatsuyama, Japan

[73] Assignee: Airbag Systems Company, Ltd., Tomioka, Japan

[21] Appl. No.: 19,673

[22] Filed: Feb. 19, 1993

[30] Foreign Application Priority Data

Feb. 26, 1992 [JP] Japan .................................. 4-072998

[51] Int. Cl.⁵ ...................... B60R 21/16; B60R 21/32
[52] U.S. Cl. ..................................... 280/735; 180/268
[58] Field of Search .................. 280/735, 806, 728 R, 280/801 R; 180/268; 307/10.1

[56] References Cited

U.S. PATENT DOCUMENTS

| 4,620,721 | 11/1986 | Scholz et al. | 280/801 R |
|---|---|---|---|
| 4,845,377 | 7/1989 | Swart | 280/735 |
| 4,984,651 | 1/1991 | Grösch et al. | 280/735 |
| 5,166,880 | 11/1992 | Furui | 280/735 |

FOREIGN PATENT DOCUMENTS

| 2-63954 | 3/1990 | Japan | 280/806 |
|---|---|---|---|
| 3-16854 | 1/1991 | Japan . | |

Primary Examiner—Karin L. Tyson
Attorney, Agent, or Firm—Pollock, Vande Sande & Priddy

[57] ABSTRACT

An apparatus for controlling a plurality of vehicle safety devices, for example two safety devices, that are normally set to operate in a set time sequence, whereby if the vehicle is in a collision and the first safety device malfunctions, the second safety device is immediately activated to ensure passenger safety.

9 Claims, 2 Drawing Sheets

APPARATUS FOR CONTROLLING A PLURALITY OF VEHICLE SAFETY DEVICES

BACKGROUND OF THE INVENTION

1. Field of the Invention

The present invention relates to an apparatus for controlling a plurality of vehicle safety devices.

2. Prior Art

Air bag systems and preloader systems are representative examples of various vehicle safety systems/devices that have been developed to protect passengers from the shock of vehicle collisions. However, an effective way of ensuring the safety of passengers involved in a vehicle collision is to use two types of safety system. For example, an arrangement that is known is to equip the driver's seat with an air bag system and a preloader system, and when it is sensed that a collision has occurred, first the preloader system is activated and this is followed by the activation of the air bag system, thereby providing the driver with increased safety assurance.

This type of conventional arrangement has drawbacks, however. An air bag system is set to operate after a certain delay that is based on the assumption that the passenger is restrained by a seatbelt. Therefore, if for example the preloader system should malfunction and fail to operate in a collision, the passenger, especially the passenger's head, will be moved a considerable way forward before the air bag has inflated sufficiently, and it is even possible that the operation of the air bag system cannot ensure the passenger's safety.

SUMMARY OF THE INVENTION

An object of the present invention is therefore to provide an improved vehicle safety device control apparatus that ensures increased safety for passengers.

Another object of the present invention is to provide a vehicle safety device control apparatus that can effectively activate a vehicle safety device in response to the malfunction of a plurality of vehicle safety devices.

A further object of the invention is to provide an apparatus for controlling a plurality of vehicle safety devices that can perform the functions required to ensure the safety of passengers in a vehicle having a plurality of vehicle safety devices that are arranged so as to operate with a time differential, even if any of the said safety devices should malfunction.

In accordance with the present invention, the above objects are attained by an apparatus for controlling a plurality of vehicle safety devices that is provided with vehicle collision discrimination means and triggers the safety devices in a time-staggered sequence in response to a discrimination output from the collision discrimination means, comprising malfunction detection means that detects whether or not a safety device has activated in sequence, and a timing adjustment means that advances the activation timing of a safety device that is set to activate next in the sequence, if the malfunction detection means detects that the preceding safety device has failed to trigger. Thus, if the malfunction detection means detects that one of the vehicle safety devices has failed to function in sequence, to ensure the safety of the passenger the activation timing of a safety device that is set to activate next in the sequence is advanced.

The invention will be better understood and other objects and advantages thereof will be more apparent from the following detailed description of preferred embodiments with reference to the drawings.

DETAILED DESCRIPTION OF THE PREFERRED EMBODIMENT

Figure 1:
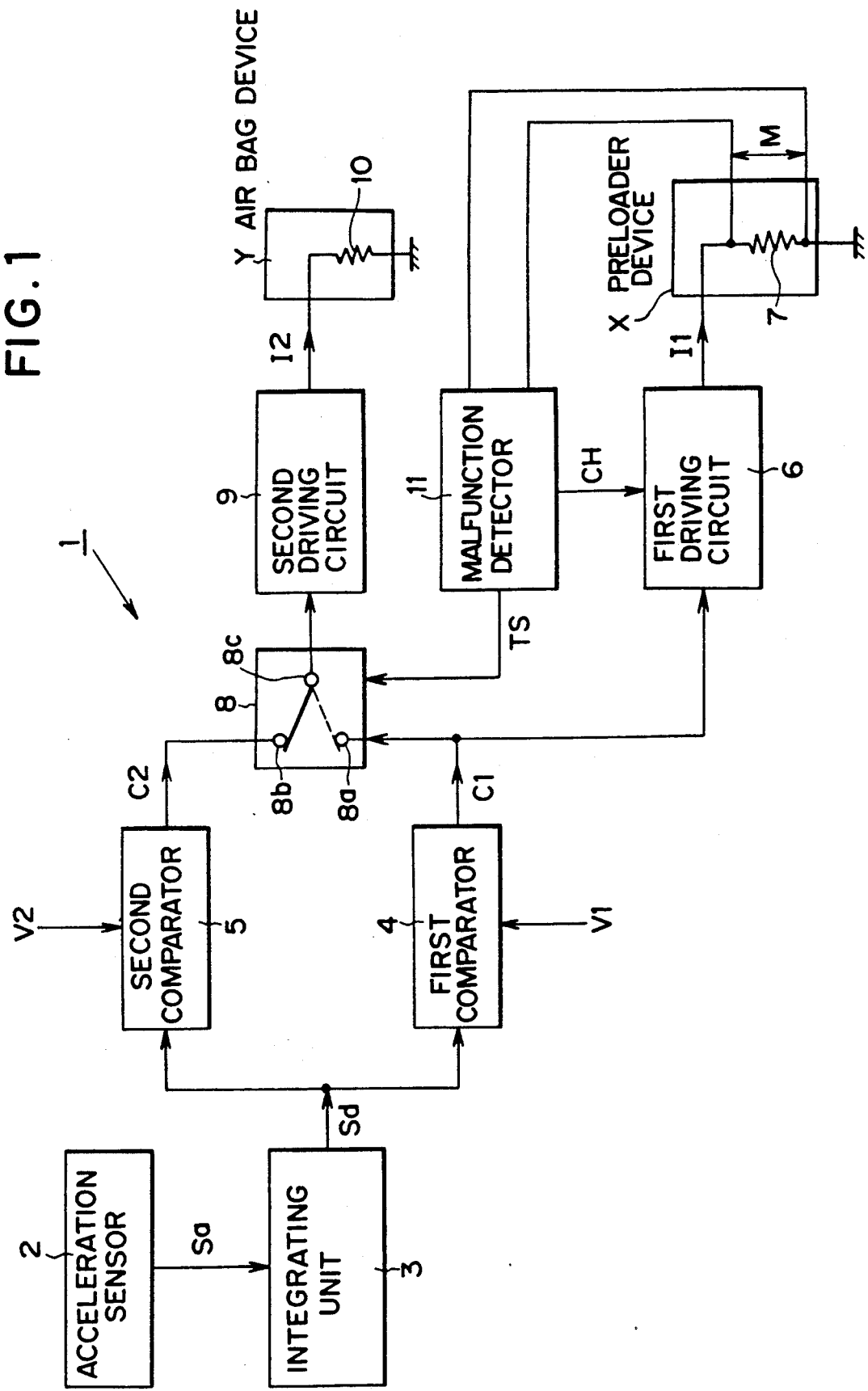
FIG. 1 is a schematic diagram of the arrangement of a control apparatus according to an embodiment of the present invention.

FIG. 1 is a schematic diagram of the configuration of a control apparatus for controlling vehicle safety devices in accordance with an embodiment of the present invention. In accordance with the arrangement of this embodiment, a control apparatus 1 controls the activation of two safety devices, a preloader device X and an air bag device Y, provided in a vehicle.

The control apparatus 1 is affixed at a suitable location in the vehicle and is equipped with a known acceleration sensor 2 which outputs an acceleration signal Sa that indicates the acceleration of the vehicle. When the acceleration signal Sa exceeds a certain preset level it is subjected to integration processing by an integrating unit 3, which then outputs an integration output signal Sd that indicates the changing status of vehicle speed.

Figure 2:
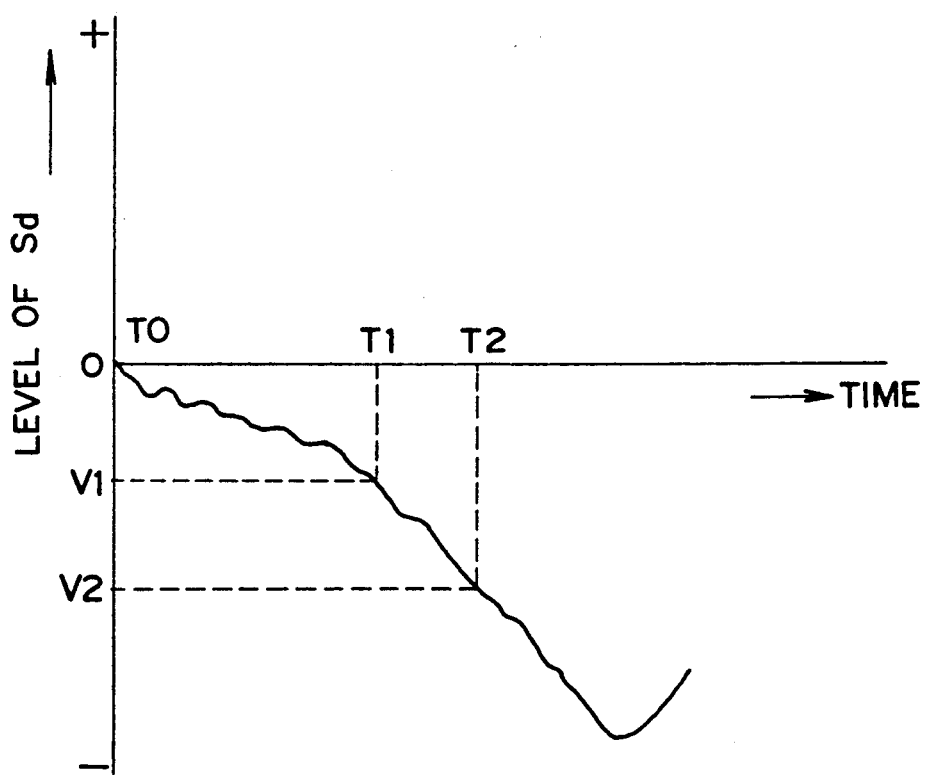
FIG. 2 is a diagram of a waveform for illustrating the operation of the control apparatus.

FIG. 2 shows an example of a plot of how the integration output signal Sd changes when the vehicle is in a collision. Specifically, FIG. 2 shows changes in the level of the integration output signal Sd following the commencement of the acceleration signal Sa integration triggered by the acceleration signal Sa exceeding a predetermined level at time T0. As a known arrangement is used for the integrating unit 3 that has the integrating capability for integrating the vehicle acceleration signal to detect when the vehicle is in a collision, details thereof are omitted.

With reference again to FIG. 1, a first comparator 4 and a second comparator 5 are provided for determining the activation timings of the vehicle's preloader device X and air bag device Y based on the level of the integration output signal Sd. The first comparator 4 compares the level of the integration output signal Sd with the level of a first reference voltage V1 (FIG. 2), and, if the level of the integration output signal Sd is lower than that of the first reference voltage V1, outputs a first discrimination output C1 that goes high, and if the level of the integration output signal Sd is lower than that of a second reference voltage V2 (FIG. 2), outputs a second discrimination output C2 that goes high.

From FIG. 2 it can be seen that as the first reference voltage V1 is set higher than the second reference voltage V2, when the vehicle suffers a collision, the first discrimination output C1 goes from low to high and then the second discrimination output C2 goes from low to high.

The first discrimination output C1 is input to a first driving circuit 6. In response to the change from low to high of the first discrimination output C1, the first driving circuit 6 supplies a first ignition current I1 to the ignition squib 7 of the preloader device X. As a result, if the level of the integration output signal Sd has become lower than that of the first reference voltage V1, first the preloader device X is triggered in response to the first ignition current I1, restraining the passenger.

The second discrimination output C2 is applied to input terminal 8b of selection switch 8, the other input terminal 8a of which is used to receive the first discrimination output C1. The output terminal 8c (which has a movable contact) of the selection switch 8 is connected to the input of a second driving circuit 9. The selection switch 8 is controlled by a malfunction detector 11, as described below, so that either first discrimination output C1 or second discrimination output C2 can be applied as an input signal to the second driving circuit 9. In response to the input signal from the selection switch 8 going from a low level to a high level, the second driving circuit 9 supplies a second ignition current I2 to the ignition squib 10 of the air bag device Y.

The malfunction detector 11 is for detecting whether or not a malfunction has occurred that will interfere with the activation of the preloader device X. In the illustrated embodiment, the malfunction detector 11 determines whether there is any malfunction in the ignition system of the ignition squib 7 by sending a malfunction detection check signal CH to the first driving circuit 6 and examining how this affects the state of a signal M produced at both terminals of the ignition squib 7. Such an arrangement is disclosed by JP-A-3-16854/91, for example, but other known arrangements may be used for the malfunction detector 11. In such a case, the malfunction detector 11 only needs to be able to detect a discontinuity in the ignition squib 7; it is not necessary to include a check of the operational status of the driving circuits.

If the malfunction detector 11 determines that there is no malfunction in the ignition system of the ignition squib 7, the malfunction detection output signal TS goes high, whereby the selection switch 8 assumes the state indicated in FIG. 1 by a solid line and the second discrimination output C2 is input to the second driving circuit 9. If however the malfunction detector 11 determines that there is a malfunction in the ignition system of the ignition squib 7, the malfunction detection output signal TS goes low, whereby the selection switch 8 assumes the state indicated in FIG. 1 by a broken line and the first discrimination output C1 is input to the second driving circuit 9 as well as to the first driving circuit 6.

Thus, providing there is no malfunction of the ignition system of the preloader device X that is set to be triggered first, the first discrimination output C1 is input to the first driving circuit 6 and the second discrimination output C2 is input to the second driving circuit 9, so that in a collision the first ignition current I1 is supplied to the ignition squib 7 of the preloader device X, following which the second ignition current I2 is supplied to the ignition squib 10 of the air bag device Y at the point at which the level of the integration output signal Sd drops below the second reference voltage V2. As a result, when it is determined that the vehicle is in a collision the preloader device X is triggered at T1 and is followed by the triggering of the air bag device Y at T2.

On the other hand, if the malfunction detector 11 determines that there is a malfunction in the ignition system of the preloader device X squib 7, the selection switch 8 assumes the state indicated by the broken line and the first discrimination output C1 is input to the second driving circuit 9. Thus, at the point at which the level of the integration output signal Sd goes below the first reference voltage V1, that is, at the point T1 at which preloader device X should have been triggered, air bag device Y is triggered. In other words, the activation timing of the air bag device Y is advanced.

In accordance with the above arrangement, when the vehicle is in a collision and no malfunction of the safety devices is detected, the preloader device X is the first to be triggered and is followed, after a short pause, by the triggering of the air bag device Y. However, if any malfunction is detected in the preloader device and/or the related circuits thereof, instead of being triggered a set time after the triggering of the preloader device X, the air bag device Y is triggered immediately in response to the detection or discrimination of the occurrence of the vehicle collision, allowing the air bag to inflate sufficiently before the head of the passenger, who is not restrained by a seatbelt, has time to move very far to the front. Thus, even if there is a malfunction of, for example, the preloader device X, the safety of the passenger is still ensured by the air bag device Y.

While the above embodiment of the invention has been described with reference to an arrangement in which separate circuits are used, the same effect can be achieved by using an appropriate control program executed by a microcomputer.

What is claimed is:

1. An apparatus for controlling a plurality of vehicle safety devices, comprising:
   sensor means for detecting vehicle acceleration;
   integrating means for carrying out integration processing of output from the sensor means for vehicle collision detection;
   first discrimination means for discriminating whether or not an output level from the integrating means has reached a predetermined first reference level;
   first means for activating a first vehicle safety device in response to the discrimination output from the first discrimination means;
   second discrimination means for discriminating whether or not an output level from the integrating means has reached a predetermined second reference level for activating another vehicle safety device after the elapse of a prescribed time from the activation of the first vehicle safety device;
   malfunction detection means for detecting whether or not any malfunction has occurred in the activation system of the first vehicle safety device;
   selection means that in accordance with the output of the malfunction detection means selects the output of the second discrimination means when it is determined that there is no malfunction in the activation system of the first vehicle safety system, and selects the output of the first discrimination means when it is determined that there is a malfunction in the activation system of the first vehicle safety system; and
   second means for activating another vehicle safety device in response to the selection by the selection means.

2. The apparatus according to claim 1, in which the integrating means outputs a voltage signal indicating the changing status of vehicle speed when the vehicle is in a collision.

3. The apparatus according to claim 2, in which the first reference level is set to the voltage signal level corresponding to a prescribed activation timing of the first vehicle safety device.

4. The apparatus according to claim 2, in which the second reference level is set to the voltage signal level corresponding to a prescribed activation timing of the second vehicle safety device.

5. The apparatus according to claim 1, in which the first means supplies an ignition current to an ignition element of the first vehicle safety device in response to a discrimination output from the first discrimination means.

6. The apparatus according to claim 5, in which the malfunction detection means determines whether or not there is a malfunction in the ignition system of the ignition element by applying a malfunction detection check signal to the first means and examining the resultant state of a signal produced at the terminals of the ignition element.

7. The apparatus according to claim 1, in which the first vehicle safety device is a preloader device and the second vehicle safety device is an air bag device.

8. The apparatus according to claim 1, in which the malfunction detection means is for detecting whether or not any malfunction has occurred in the first means or in an ignition element of the first vehicle safety device.

9. A vehicle safety device control apparatus that when a vehicle collision is detected, activates a preloader device and, after a prescribed timing delay, activates an air bag device, said vehicle safety device control apparatus being provided with means for detecting whether or not there is a malfunction in an ignition system of the preloader device, and timing adjustment means that, when the malfunction detection means detects that there is a malfunction in the ignition system and it is detected that the vehicle is in a collision, causes the air bag device to be activated without any timing delay.

* * * * *